(12) United States Patent
Smorodinsky et al.

(10) Patent No.: US 6,334,196 B1
(45) Date of Patent: Dec. 25, 2001

(54) ESTIMATOR PROGRAM FOR ESTIMATING THE AVAILABILITY OF AN APPLICATION PROGRAM THAT RUNS IN A CLUSTER OF AT LEAST TWO COMPUTERS

(75) Inventors: Lev Smorodinsky, Laguna Hills; Norman Roy Smith, Lake Forest, both of CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/249,171

(22) Filed: Feb. 12, 1999

(51) Int. Cl.$^7$ ...................................................... S06F 11/00
(52) U.S. Cl. .............................................. 714/37; 709/108
(58) Field of Search ................................. 714/37, 38, 41, 714/42, 44, 47, 54, 2, 5, 6, 8, 11; 709/108, 223, 224

(56) References Cited

U.S. PATENT DOCUMENTS

| | | | | |
|---|---|---|---|---|
| 6,000,046 | * | 12/1999 | Passmore | 714/57 |
| 6,021,508 | * | 2/2000 | Schmuck et al. | 714/4 |
| 6,058,491 | * | 5/2000 | Bossen et al. | 714/15 |
| 6,134,673 | * | 10/2000 | Chrabaszcs | 714/13 |
| 6,202,149 | * | 3/2001 | Hedegard | 713/100 |
| 6,243,774 | * | 6/2001 | Eide et al. | 710/103 |
| 6,263,433 | * | 7/2001 | Robinson et al. | 713/100 |

* cited by examiner

*Primary Examiner*—Nadeem Iqbal
(74) *Attorney, Agent, or Firm*—Charles J. Fassbender; Mark T. Starr; Lise A. Rode

(57) ABSTRACT

An estimator program is disclosed which performs method steps for estimating the availability of an application program that runs on any computer in a cluster of at least two computers. By the availability of an application program is herein meant the probability that at any particular time instant, at least one of the computers in the cluster will actually be servicing requests from external workstations to use the application program. In one embodiment, the estimator program begins by receiving input parameters which include 1) multiple downtime periods for each computer in the cluster that occur at respective frequencies due to various downtime sources, and 2) an application failover time period for switching the running of the application program from any one computer to another. From those input parameters, the estimator program estimates first and second annual stoppage times, and then determines the availability of the application program on the cluster from the sum of the first and second annual stoppage times.

19 Claims, 7 Drawing Sheets

FIG. 5A

STEP 1 → SELECT HWSTOPS/YR = 0.8 = A

STEP 2 → SELECT ATDHW = 6 HRS = B

STEP 3 → SELECT SWSTOPS/YR = 12 = C

STEP 4 → SELECT ATDSW = 1 HR = D

STEP 5 → SELECT SASTOPS/YR = 20 = E

STEP 6 → SELECT ATDSA = 0.5 HR = F

STEP 7 → SELECT FAILOVER TIME (FT) = 1 MINUTE = 1/60 HR = G

STEP 8 → SINGLE COMPUTER VIRTUAL STOPPAGE RATE (SCVSR) = (A)+(C)+(E)

STEP 9 → SCVSR = 0.8+12+20 = 32.8 STOPS/YR

STEP 10 → SINGLE COMPUTER VIRTUAL DOWNTIME (SCVD) = $\frac{(A)(B)+(C)(D)+(E)(F)}{(A)+(C)+(E)}$ STEP 11 → SCVD = $\frac{(0.8)(6)+(12)(1)+(20)(0.5)}{0.8+12+20}$ = $\frac{26.8}{32.8}$ = 0.817 HR STEP 12 → SINGLE COMPUTER TIME BETWEEN VIRTUAL STOPS (SCTBVS) = $\frac{8760}{(SCVSR)}$ STEP 13 → SCTBVS = $\frac{8760}{32.8}$ = 267.0 HRS

FIG. 5B

STEP 14 → RATIO (R) = $\dfrac{SCVD}{SCTBVS}$

STEP 15 → R = $\dfrac{0.817}{267.0}$ = 0.003059

STEP 16 → PROBABILITY OF CONCURRENT STOPPAGE (PCS) = $2(R^2)$

STEP 17 → PCS = $2(0.003059)^2$ = 0.0000186

STEP 18 → CONCURRENT STOPPAGE PER YEAR (CS/YR) = (PCS)(8760)

STEP 19 → CS/YR = (0.0000186)(8760) = 0.1629 HR/YR

STEP 20 → FAILOVER STOPPAGE PER YEAR (FS/YR) = (SCVSR)(FT)

STEP 21 → FS/YR = (32.8)(1/60) = 0.5466 HR/YR

STEP 22 → APPLICATION AVAILABILITY (AA) = 1 − $\dfrac{(CS/YR)+(FS/YR)}{8760}$

STEP 23 → AA = 1 − $\dfrac{0.1629+0.5466}{8760}$ = 0.999919

STEP 16' → PROBABILITY OF CONCURRENT STOPPAGE (PCS) = $6(R^3)$

STEP 16" → PROBABILITY OF CONCURRENT STOPPAGE (PCS) = $(N!)R^N$

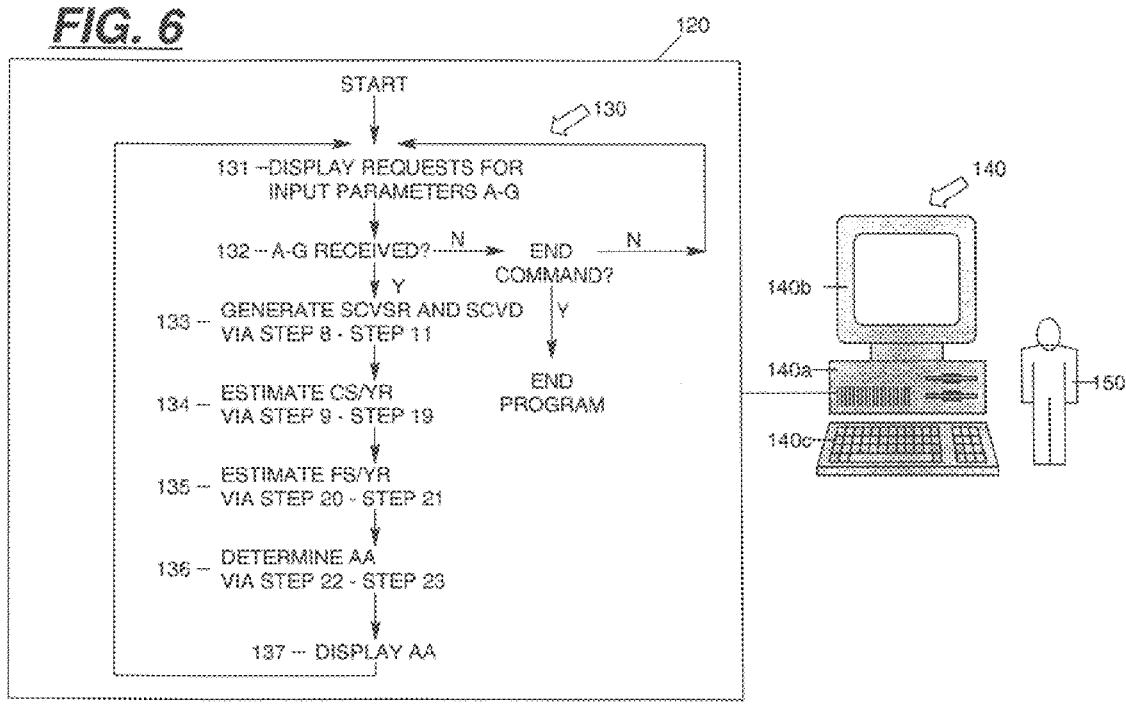

ESTIMATOR PROGRAM FOR ESTIMATING THE AVAILABILITY OF AN APPLICATION PROGRAM THAT RUNS IN A CLUSTER OF AT LEAST TWO COMPUTERS

BACKGROUND OF THE INVENTION

This invention relates to data processing systems of the type which include a cluster of at least two computers that execute application programs in a "failover" mode of operation; and more particularly, this invention relates to methods for estimating the "availability" of the application programs in the above type of data processing systems.

To explain the failover mode of operation as that term is used herein, consider the case where the cluster includes only two computers. Initially, the cluster operates in a first state wherein both of the computers are available to run the application programs. But in that first state, only one of the computers (computer #1) is servicing requests to use the application programs. The cluster remains in the first state until a stoppage occurs in computer #1.

Then, a transition is made to a second state wherein the other computer (computer #2) assumes responsibility for handling all requests to use the application programs but does not yet run those programs. This second state lasts only temporarily, and it is herein called the failover state. Then a transition is made to a third state.

In the third state, computer #2 services requests to use the application programs; and at the same time, repair work is performed on computer #1 to try to fix the cause of the stoppage. If computer #1 is made operable before computer #2 stops, then a transition is made back to the first state. Otherwise, if computer #1 is not made operable before computer #2 stops, then a transition is made to a fourth state wherein no requests to use the application programs are serviced.

The cluster remains in the fourth state until one of the computers is made operable. When that occurs, a transition is made back to the third state. There, the one computer which is operable services all requests to use the application programs; and at the same time, repair work is performed on the stopped computer.

By the availability of an application program is herein meant the probability that at any particular time instant, at least one of the computers will actually be servicing the requests to use the application programs. In the above described cluster of two computers, the application programs are not available for use in both the second state and the fourth state.

In the prior art, methods which are somewhat related to the availability of an application program in a cluster of computers is described in a book which is entitled "Reliable Computer Systems" (second edition) by Daniel P. Siewiorek and Robert S. Swarz, copyrighted 1992 by Digital Equipment Corporation and published in Digital Press (hereinafter Siewiorek). There, in FIG. 5-19c on page 314, a three state Markoff model is shown to describe how a the cluster of two computers operates. Also, an equation 32 on page 316 expresses the operability of a computer in the cluster whose state diagram corresponds to FIG. 5.19c.

However, one problem with Siewiorek is that the above state diagram and equation do not account for any time which it takes to switch the responsibility for handling requests to use the application programs from one computer to another. In particular in FIG. 5.19c, there is no failover state. Thus Siewiorek only addresses when a computer in a cluster is operable, and does not address when an application program is available for use.

Another problem with Siewiorek is that it only accounts for a single source of stoppage that occurs at a single rate "$\lambda$" which has a single repair rate "$\mu$". This however, is unrealistic because in an actual cluster of several computers, each application program can become unavailable due to a hardware stoppage or a software stoppage or a system administrator stoppage which occur at different frequencies with different repair times.

Still another problem with Siewiorek is that the expression for the operability of a cluster of two computers, as given by equation 32, is quite complex. In addition, other expressions for the operability of a cluster of more than two computers, as provided by Siewiorek, are even more complex. This is evident from page 839 of the Siewiorek wherein the third formula from the top of the page applies to a cluster of N computers and is extremely complex.

Accordingly, a primary object of the present invention is to provide a method for estimating the availability of application programs in a cluster of computers by which the above problems are overcome.

BRIEF SUMMARY OF THE INVENTION

In accordance with the present invention, a novel estimator program is provided which performs method steps for estimating the availability of an application program that runs on any computer in a cluster of at least two computers. In one particular embodiment, the estimator program begins by receiving input parameters which include multiple downtime periods for each computer in the cluster that occur at respective frequencies due to various downtime sources. Also, the estimator program receives an application failover time period for switching the running of the application program from any one of the computers to another. Next, the estimator program uses the input parameters to generate a single computer virtual downtime period and a single computer virtual time between stops and a single computer virtual stoppage rate. Then, the estimator program estimates a first annual stoppage time for the application program, due solely to concurrent stoppage of all of the computers, as a function of the ratio of the single computer virtual downtime period over the single computer virtual time between stops. Next, the estimator program estimates a second annual stoppage time for the application program, due solely to switching the running of the application program from one computer to another as a function of the single virtual stoppage rate and the application failover time period. Then, the estimator program determines the availability of the application program on the cluster from the sum of the first and second annual stoppage times.

BRIEF DESCRIPTION OF THE DRAWINGS

FIGS. 5A and 5B show a process which estimates the availability of the application programs within the cluster in the FIG. 1 System, in accordance with the present invention.

FIG. 6 shows an estimator program, that is embodied in a program storage device, which estimates the availability of the application programs by performing the process steps of FIGS. 5A and 5B.

DETAILED DESCRIPTION

Figure 1:
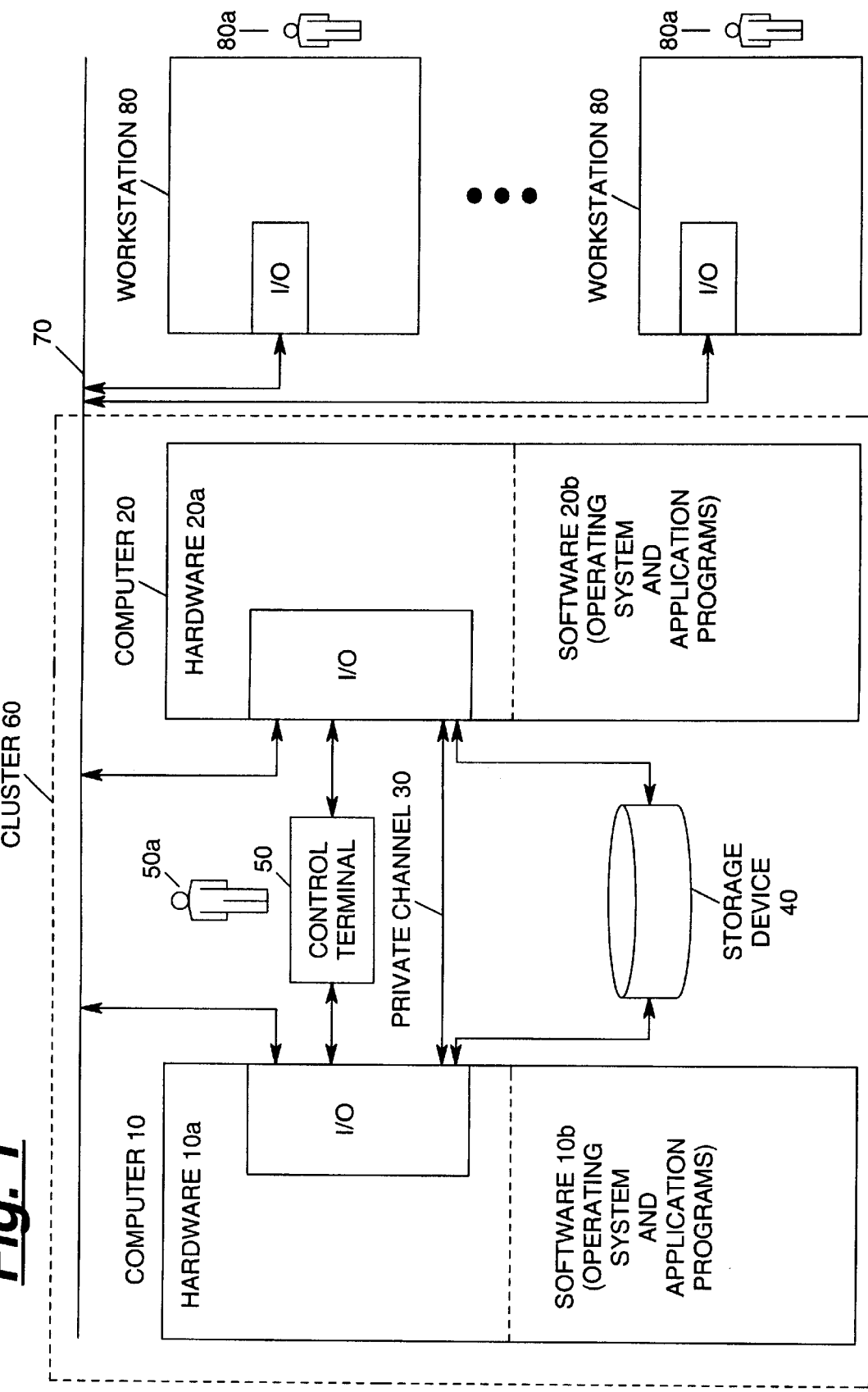
FIG. 1 shows a data processing system, that executes application programs in a cluster of two computers, to which the present invention can be applied to estimate the availability of the application programs.

Referring now to FIG. 1, it shows a data processing system to which the present invention can be applied to estimate the availability of an application program. This FIG. 1 data processing system includes several components, each of which is identified and described below in Table I.

TABLE I

| COMPONENT | DESCRIPTION |
|---|---|
| 10 | Component 10 is a complete digital computer which is capable of storing and executing various software programs by itself. All of the items which are included within computer 10 are represented in FIG. 1 as hardware 10a and as software 10b. For example, the hardware 10a will include an instruction processor (such as an Intel 486), a random access semiconductor memory, and a magnetic disc memory. Also as an example, the software 10b will include an operating system (such as the Windows NT Server Operating System from Microsoft Corp.), and several application programs. |
| 20 | Component 20 is substantially similar in all respects to component 10 and it can be a duplication of the component 10. Thus, component 20 is a complete digital computer which is capable of storing and executing the same software programs as those which are stored and executed by computer 10. |
| 30 | Component 30 is substantially similar in all respects to component 10 can it can be a private communications channel between two I/O ports on the computers 10 and 20. On this channel, the computers 10 and 20 can send messages and data to each other. |
| 40 | Component 40 is an external magnetic storage device, such as an array of discs, which is coupled to both of the computers 10 and 20. This storage device 40 provides a database, and all information that is stored on the magnetic storage device 40 can be accessed by the computers 10 and 20. |
| 50 | Component 50 is a control terminal which is coupled to both of the computers 10 and 20. This control terminal 50 is used by a system administrator to oversee the operation of the computers 10 and 20. For example, the system administrator uses the control terminal 50 to selectively stop the computers 10 and 20 for maintenance. Also the system administrator uses the control terminal 50 to direct the loading of new software programs and software upgrades into the computers 10 and 20. |
| 60 | Component 60 is a single cluster which consists of all of the components 10–50. |
| 70 | Component 70 is a communications network which is coupled to I/O ports on the computers 10 and 20. On this communications network 70, messages can be sent to the computers 10 and 20 from an external workstation. This network 70 can be the Internet, for example. |
| 80 | Each component 80 is a workstation which is coupled to the cluster 60 via the |

TABLE I-continued

| COMPONENT | DESCRIPTION |
|---|---|
| | communications network 70. At each workstation 80, an operator 80a can use an I/O device (such as a keyboard or a mouse) to request that various operations be performed by an application program in the cluster 80. |

To initiate the use of one of the application programs in the FIG. 1 system, an operator 80a at a workstation 80 makes an input via his keyboard or mouse. For example, the operator 80a can use his mouse to select a particular item that is displayed on his monitor, and that selection can implicitly ask for certain information that is provided by a particular application program.

In response to such an input by the operator 80a, the workstation 80 sends a request via the communication network 70 to the cluster 60. From the point of view of the operator 80a, the cluster 60 is a single indivisible node. Thus, computer 10 can respond to the request by running the particular application program and sending a result back to the workstation 80; or, computer 20 can respond to the request in the same fashion.

Initially, in the cluster 60, all requests on the network 70 to use the application programs are handled by the computer 10. This mode of operation continues until computer 10 becomes unavailable. Then, all requests on the network 70 to use an application program are handled by computer 20.

Once computer 20 starts to handle all requests on the network 70 for use of the application programs, that mode of operation continues until computer 20 becomes unavailable. Then, if computer 10 is available, all requests on the network 70 to use the application programs are handled by computer 10.

At various times, computer 10 and computer 20 will both be unavailable; and when that occurs, all requests on the network 70 to use an application program will fail. Thereafter, if computer 10 becomes available before computer 20, then computer 10 will handle all requests on the network 70 to use the application programs. Conversely, if computer 20 becomes available before computer 10, then computer 20 will handle all requests on the network 70 to use the application programs.

Figure 2:
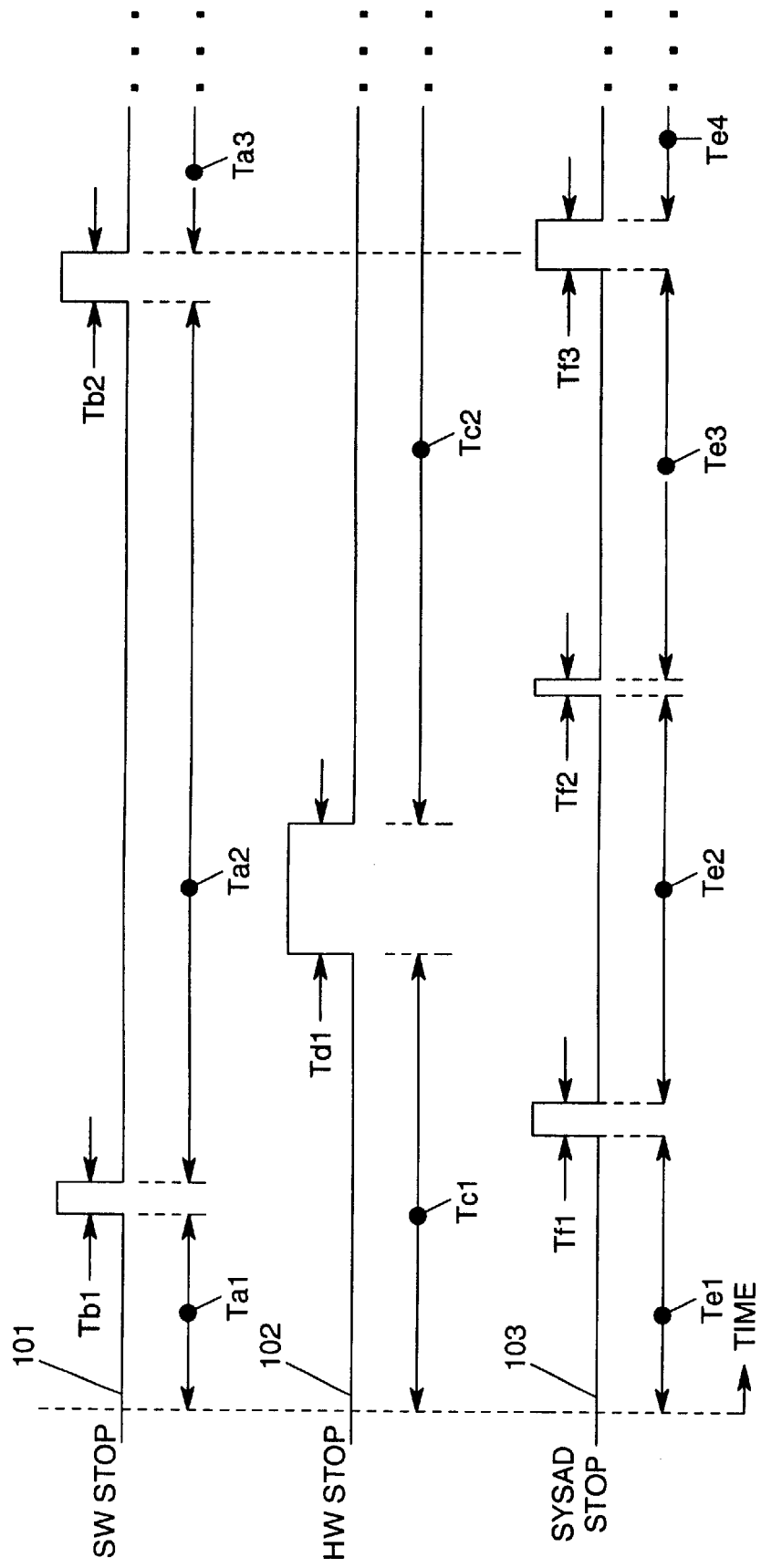
FIG. 2 is a timing diagram which shows when hardware stoppages, software stoppages, and system administrator stoppages occur in any one of the two computers within the cluster in the FIG. 1 system.

Each of the computers 10 and 20 can become unavailable at any time for three different reasons; and this is illustrated in FIG. 2. There, a curve 101 shows the stoppage of either one of the computers 10 or 20 due to an error in the software 10b or 20b. Also in FIG. 2, a curve 102 shows the stoppage of either one of the computers 10 or 20 due to a fault in the hardware 10a or 20a. Further in FIG. 2, a curve 103 shows the stoppage of either one of the computers 10 or 20 due to human errors by the system administrator 50a.

Inspection of the curves 101, 102 and 103 show that the software caused stoppages, the hardware caused stoppages, and the system administrator caused stoppages each occur in a random manner with different time durations and different frequencies. For example, in curve 101, two software caused stoppages occur with time durations Tb1 and Tb2; and they are spaced by time intervals Ta1, Ta2 and Ta3. In curve 102, one hardware caused stoppage occurs with a time duration Td1; and it is spaced by time intervals Tc1 and Tc2. In curve 103, three system administrator caused stoppages occur with time durations Tf1, Tf2 and Tf3; and they are spaced by time intervals Te1, Te2, Te3 and Te4.

Hardware stoppages are caused by the failure of a physical structure within the computers 10 and 20. These physical structures include various items such as power supplies, circuits within the instruction processor, circuits within the random access semiconductor memory, etc. As a realistic average, one hardware stoppage occurs every 1,000–20,000 hours with a time duration for repair of 1–60 hours.

Software stoppages are caused for a faults within the operating system and/or the application programs 10b and 20b. High quality certified software has a small number of faults, whereas low quality uncertified software has a large number of faults. As a realistic average, one software stoppage occurs every 1–1,000 hours with a time duration of 1–60 minutes.

System administrator stoppages are caused by both intentional and unintentional acts of the system administrator 50a. For example, an intentional stoppage occurs when the system administrator stops one of the computers 10 and 20 to perform maintenance on it or to upgrade the software. An unintentional stoppage occurs when the system administrators makes any error which causes one of the computers 10 or 20 to malfunction. For example, the system administrator 50a can inadvertently delete a file from computer 10 which is needed by the application programs. As a realistic average, one system administrator stoppage occurs every 1–500 hours with a time duration of 1–30 minutes.

Figure 3:
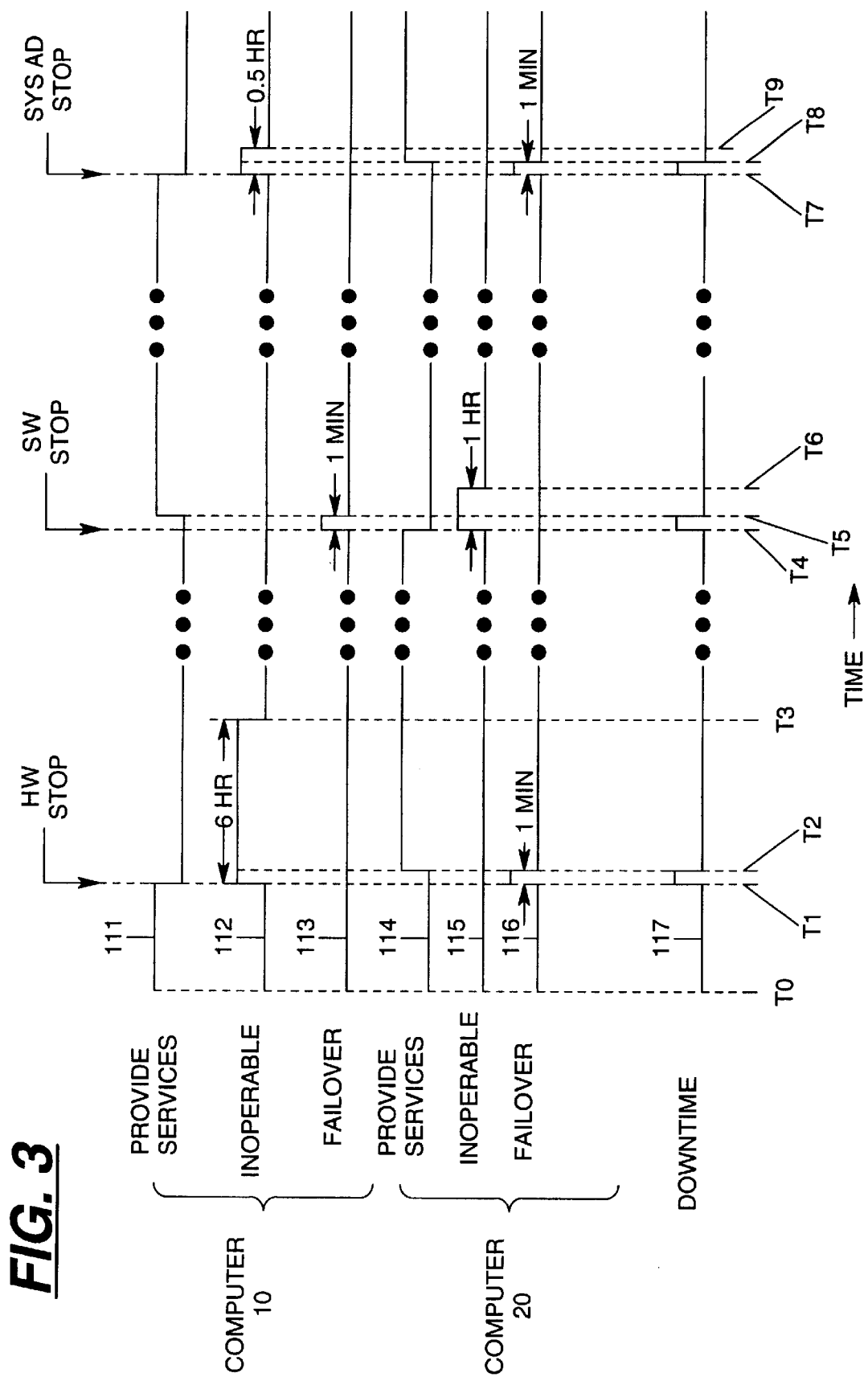
FIG. 3 shows an example of how the hardware stoppages, software stoppages, and system administrator stoppages of FIG. 2 affect the availability of the application programs in the FIG. 1 system.

Turning now to FIG. 3, it shows an example of how the hardware stoppages, software stoppages, and system administrator stoppages affect the availability of an application program in the cluster 60. Included in FIG. 3 are seven curves 111–117. Curves 111, 112, and 113 show the operation of computer 10; curves 114, 115 and 116 show the operation of computer 20; and curve 117 shows the downtime for the cluster 60 as a whole. During the cluster downtime of curve 117, the application programs are not available for use by the workstations 80.

Initially in FIG. 3, at time T0, both of the computers 10 and 20 are operable as is shown by curves 112 and 115. Also at time T0, all requests on the network 70 to use the application programs are handled by computer 10, and this is shown by curves 111 and 114.

Thereafter, at time T1, a hardware stoppage occurs in computer 10. Due to that hardware stoppage, computer 20 enters a failover mode of operation wherein the responsibility of handling requests on the network 70 to use the application programs is transferred to computer 20.

In FIG. 3, the reconfigure mode of operation lasts for one minute; and this is shown by curve 116. During that time interval, none of the application programs on the cluster 60 are available for use by the workstations 80, and this is shown by curve 117.

Thereafter, at time T2, computer 20 begins to service the requests from the workstations 80 to use the application programs. This is shown by curve 114. That mode of operation continues until the operation of computer 20 ends due to a hardware stoppage, a software stoppage, or a system administrator stoppage. Meanwhile, corrective action is taken by the system administrator to fix the hardware problem in computer 10. In FIG. 3, this corrective action takes place during a six hour time period which starts at time T1 and ends at time T3.

Next, at time T4 in FIG. 3, a software stoppage occurs in computer 20. Thus, computer 20 becomes inoperable as shown by curve 115; and computer 10 enters the failover mode of operation as shown by curve 113. In that failover mode, the responsibility for handling all requests on the network 70 to use the application programs is transferred to computer 10. This reconfiguration mode of operation last for one minute.

Then as shown by curve 111 at time T5, computer 10 begins handling all of the requests which occur on the network 70 to use the application program. That mode of operation continues until computer 10 becomes inoperable due to a hardware stoppage, a software stoppage, or a system administrator stoppage. Meanwhile, the system administrator takes corrective action on computer 20 to fix the software stoppage that started at time T4. In FIG. 6, this corrective action is completed in a time interval of one hour, which ends at time T6.

Thereafter, computer 10 becomes inoperable due to a system administrator stoppage; and this is shown at time T7 in curve 112. In response, computer 20 enters the failover mode of operation wherein it becomes responsible for handling all requests on the network 70 to use the application programs. This failover mode of operation lasts for one minute; and then, at time T8, the servicing the requests by computer 20 begins. Meanwhile, the system administrator 50a acts to correct the system administration stoppage problem. This corrective action is completed in a half-hour time period which ends at time T9.

Figure 4:
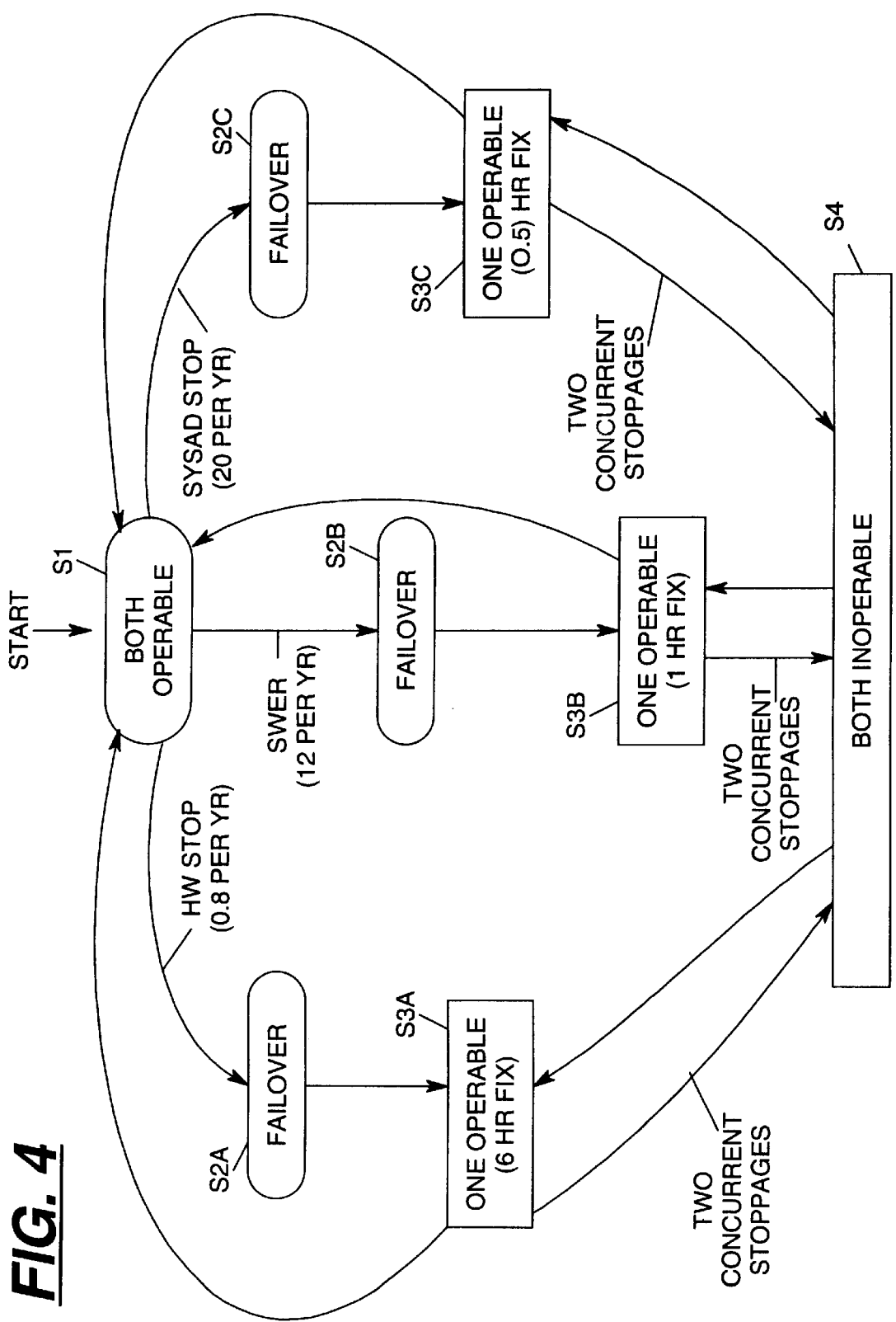
FIG. 4 is a state diagram which shows all of the operable and inoperable states that occur within the cluster in the FIG. 1 system.

Turning next of FIG. 4, the availability of an application program in the cluster 60 is indicated by a state diagram. Initially, the cluster 60 operates in a state S1 wherein both of the computers 10 and 20 are available to run the application programs. But in state S1, only one of the computers 10 or 20 is servicing requests from the workstations 80 to use to application program, while the other computer is idle.

Cluster 60 remains in state S1 until a hardware stop or a software stop or a system administrator stop occurs in the computer which is servicing the workstation requests. When a hardware stop occurs, a transition is made from state S1 to state S2A; when a software stop occurs, a transition is made from state S1 to state S2B; and when a system administrator stop occurs, a transition is made from state S1 to state S2C.

In each of the states, S2A, S2B, and S2C, one of the computers 10 or 20, enters the failover mode of operation. In that mode, the computer which previously was not servicing any requests from the workstations, becomes responsible for handling all requests to use the application programs. This failover mode of operation lasts for only a short period of time, such as one minute.

Next, from the failover states S2A, S2B, and S2C, respective transitions are made to the states S3A, S3B, and S3C. In state S3A, a hardware error in one of the computers 10 and 20 is being fixed while the other computer is servicing requests from the workstations 80. Similarly in state S3B, a software error in one of the computers 10 or 20 is being fixed, while the other computer is servicing the workstation requests. Likewise, in state S3C, an administrator stoppage in one of the computers 10 or 20 is being worked on, while the other computer is servicing the workstation requests.

From each of the states S3A, S3B, and S3C, a transition is eventually made back to state S1 or to another state S4. This transition is made back to state S1 if the one computer which stopped is made operable before the second computer stops. Otherwise, if both of the computers 10 and 20 stop concurrently, then a transition is made to state S4.

Cluster 60 remains in state S4 until one of the computers 10 or 20 is made operable. When that occurs, a transition is made to state S3A if a hardware problem remains to be fixed; a transition is made to state S3B if a software problem remains to be fixed; and a transition is made to state S3C if a system administrator stoppage remains to be fixed.

In each of the states S1, S3A, S3B, and S3C, the application programs in the cluster 60 are available for use by the workstations 80. Conversely, in each of the states S2A, S2B, S2C, S4, the applications programs in the cluster 60 are not available for use by the workstations 80.

Now in accordance with the present invention, steps are provided for estimating the amount of time that is spent in the failover states S2A, S2B, and S3C; and, steps are provided for estimating the amount of time that is spent in state S4 where both of the computers 10 and 20 are inoperable. Then, using those estimations, the availability of an application program on the cluster 60 is determined. These steps will now be described in conjunction with FIGS. 5A and 5B.

In step 1 of FIG. 5A, an estimate is made of the average number of hardware stops per year (HWSTOPS/YR) that occur in each one of the computers 10 and 20. As an example in step 1, the average number of hardware stops per year per computer is estimated to be 0.8. This step 1 estimate is herein called "A" for ease of reference in the subsequent steps.

In step 2 of FIG. 5A, an estimate is made of the average time duration of each hardware stop (ATDHW). As an example in step 2, the average time duration of each hardware stop is estimated to be six hours. This step 2 estimate is herein called "B" for ease of reference in the subsequent steps.

In step 3 of FIG. 5A, an estimate is made of the average number of software stops per year (SWSTOPS/YR) that occur in each one of the computers 10 and 20. As an example in step 3, the average number of software stops per year per computer is estimated to be 12. This step 3 estimate is herein called "C" for ease of reference in the subsequent steps.

In step 4 of FIG. 5A, an estimate is made of the average time duration of each software stop(ATDSW). As an example in step 4, the time duration of each software stop is selected to be one hour. This step 4 estimate is herein called "D" for ease of reference in the subsequent steps.

In step 5 of FIG. 5A, an estimate is made of the average number of system administrator stops per year (SASTOPS/YR) that occur in each one of the computers 10 and 20. As an example in step 5, the average number of system administrator stops per year per computer is estimated to be 20. This step 5 estimate is herein called "E" for ease of reference in the subsequent steps.

In step 6 of FIG. 5A, an estimate is made of the average time duration of each system administrator stop (ATDSA). As an example in step 6, the average time duration of each system administrators stop is estimated to be one-half hour. This step 6 estimate is herein called "F" for ease of reference in the subsequent steps.

In step 7 of FIG. 5A, an estimate is made of the average time duration of each failover time period (FT). As an example in step 7, the average time duration of each failover period is estimated to be one minute. This step 7 estimate is herein called "G" for ease of reference in the subsequent steps.

Next, in step 8 of FIG. 5A, the estimates which were made in steps 1–7 are used to determine a virtual stoppage rate for each of the computers 10 and 20. In particular in step 8, this "single computer virtual stoppage rate" (SVCSR) is set equal to the sum of the quantities "A" of step 1, "C" of step 3, and "E" of step 5. A numerical example of this calculation is shown in step 9 wherein the single computer virtual stoppage rate is determined to be 32.8 stops per year.

Next, in step 10, the estimates which were made in steps 1–7 are used to determine a virtual downtime period for each of the computers 10 and 20 which occurs at the above single computer virtual stoppage rate. In particular in step 10, this "single computer virtual downtime" (SCVD) is set equal to the sum of three products divided by the single computer virtual stoppage rate (SCVSR). Those three products are the quantities A times B, C times D, and E times F as estimated in step 1 through step 6. A numerical example of step 10 is shown in step 11 wherein the single computer virtual downtime is determined to be 0.817 hours.

Next, in step 12 of FIG. 5A, a time interval which occurs between the virtual stoppages in each of the computers 10 and 20 is determined. In particular in step 12, this "single computer time between virtual stops" (SCTBVS) is set equal to the quantity 8760 divided by the single computer virtual stoppage rate (SCVSR). Here, 8760 is the number of hours per year. A numerical example of step 12 is shown in step 13 wherein the single computer time between virtual stops is determined to be 267.0 hours.

Next, in step 14 of FIG. 5B, a ratio "R" is determined. This ratio "R" is an estimate of the probability of a single one of the computers 10 or 20 stopping due to a hardware stoppage or a software stoppage or a system administrative stoppage. To obtain this ratio "R", the single computer virtual downtime of steps 10 and 11 is divided by the single computer time between virtual stops of steps 12 and 13. A numerical example of step 14 is shown in step 15 wherein the single computer virtual downtime of step 11 and the single computer time between virtual stops of step 13 are used.

Next, in step 16 of FIG. 5B, the ratio "R" of steps 14 and 15 is used to estimate the probability that both of the computers 10 and 20 stop concurrently. In particular in step 16, this "probability of concurrent stoppage" (PCS) is set equal to the quantity $2(R^2)$. A numerical example of step 16 is provided in step 17 herein the ratio "R" from step 15 is used.

Next, in step 18 of FIG. 5B, an estimate is made of the total time per year during which the computers 10 and 20 are concurrently stopped. In particular in step 18, this "concurrent stoppage per year" (CS/YR) is set equal to the probability of concurrent stoppage from step 16 times the quantity 8760. A numerical example of step 18 is provided in step 19 wherein the probability of concurrent stoppage from step 17 is used.

Next, in step 20 of FIG. 5B, an estimate is made of the total stoppage time per year during which one of the computers 10 or 20 is in the failover mode of operation. In particular in step 20, this "failover stoppage time per year" (FS/YR) is set equal to the single computer virtual stoppage rate of step 8 times the failover time that is selected in step S7. A numerical example of step 20 is shown in step 21 wherein the single computer virtual stoppage rate of step 9 and the failover time of step 7 are used.

Next, in step 22 of FIG. 5B, an estimate is made of the availability of the application programs within the cluster 60 to anyone of the workstations 80. In particular in step 22 of FIG. 5B, the "application availability" (AA) is set equal to 1 minus the sum of two stoppages divided by 8760. Those two stoppages which are summed are the concurrent stoppage per year of steps 18 and 19, and the failover stoppage per year of steps 20 and 21. A numerical example of step 22 is performed in step 23 wherein the concurrent stoppage per year of step 19 and the failover stoppage per year of step 21 are used.

A preferred method of estimating the availability of an application program which runs on any computer in a cluster of two computers has now been described in detail. In addition, however, various changes and modification can be made to those details without departing from the nature and spirit of the invention.

For example, the method of estimating the availability of an application program as shown in FIGS. 5A and 5B preferably is embodied in a computer program which is stored on a media that is readable by a personal computer. This is illustrated in FIG. 6 wherein item 120 represents a magnetic disk in which the computer program 130 is stored. Program 130 is read from the magnetic media 120 by a personal computer 140 where it is executed by an instruction processor 140a in an interactive fashion with an operator 150.

Initially in the program 130, a visual display is generated on a monitor 140b, within the personal computer 140, which requests that the input parameters A–G be manually input by the operator 150. This is indicated by reference numeral 131. Program 130 waits until the input parameters A–G are manually input via the keyboard 140c in the personal computer, or until the program is terminated; and this is indicated by reference numeral 132.

After the input parameters A–G are received, the program 130 generates the single computer virtual stoppage rate (SCVSR) and the single computer virtual downtime (SCVD) by performing step 8 through step 11 of FIG. 5A as indicated by reference numeral 133. Then program 130 estimates the concurrent stoppage per year (CS/YR) by performing step 12 through step 19 of FIGS. 5A and 5B; and then program 130 estimates the failover stoppage per year (FS/YR) by performing step 20–step 21 of FIG. 5B. This is indicated by reference numerals 134 and 135.

Next, program 130 determines the application availability (AA) by performing step 22–step 23 of FIG. 5B as is indicated by reference numeral 136. Then, the application availability which is determined in step 136 is displayed by the program 130 on the monitor 140b; and this is indicated by reference numeral 137.

All of the steps 131–137 can be repeated multiple times. Thus the operator 150 can input different values for the input parameters A–G and thereby see how a change in the input parameters affects the availability of the application program. This enables the operator 150 to select, by trial-and-error, a set of input parameters A–G which will result in a FIG. 1 system that provides a particular application availability which is desired.

As another modification, information which is an important factor to the availability of an application program can be obtained by performing only a subset of the steps in FIGS. 5A and 5B. For example, the probability of concurrent stoppage (PCS) can be obtained by performing only step 1 thru step 6 and step 8 thru step 17. This PCs is particularly useful because it indicates the risk that none of the computers in the FIG. 1 system will be operable.

As another modification, the process of FIGS. 5A and 5B can be changed such that it applies to a data processing system which is the same as shown in FIG. 1, except that the cluster 60 includes three computers. Initially, all requests on the network 70 to use the application programs are handled by a first one of the three computers. This mode of operation continues until a stoppage occurs in the first computer. Then a failover state is entered temporarily wherein the application programs are unavailable while the responsibility for handling requests to use the application programs is passed to a second one of the three computers. Thereafter, all requests to use the application programs are actually serviced by the second computer; and that mode of operation continues until a stoppage occurs in the second computer. Then a failover state is entered temporarily wherein the application programs are unavailable while the responsibility for handling requests to use the application programs is passed to the third computer. Thereafter, all requests to use an application program are actually serviced by the third computer. Subsequently when a stoppage occurs in the third computer, a failover state is temporarily entered only if either the first or second computer is operable; and from that failover state, the sequence continues as described above. Otherwise, if all three computers stop concurrently, then all requests to use the application programs will fail until one of the computers becomes operable.

To account for this modification in the process of FIGS. 5A and 5B, only step 16 needs to be changed. Specifically, step 16 is replaced with step 16' as shown in FIG. 5B. There, the probability of concurrent stoppage of all three of the computers is estimated as $6(R)^3$, where R is the ratio as determined by step 14.

In like manner, the process of FIGS. 5A and 5B can be generalized to apply to a cluster of N computers, where N is 2, 3, 4, etc. To account for this modification, only step 16 needs to be replaced with step 16" as shown in FIG. 5B. There, the probability of concurrent stoppage of all N of the computers is estimated as $(N!)(R)^N$, where R is the ratio as determined by step 14 and (N!) is N factorial.

As another modification, a less accurate estimation of the application availability (AA) can be obtained by setting some of the parameters "A"–"F" which are input in step 1–step 7, equal to zero. For example, the average number of system administrator stops per year in step 5 and the average time duration of each system administrator stop in step 6, can be set to zero. Likewise, a less accurate estimation of the probability of concurrent stoppage in step 16 can be obtained in the same fashion.

Accordingly, it is to be understood that the present invention encompasses all such modifications and is defined by the appended claims.

What is claimed is:

1. A program storage device embodying an estimator program that performs method steps for estimating the availability of an application program that runs on any computer in a cluster of at least two computers; said method including the steps of:

receiving input parameters which include multiple downtime periods for each computer in said cluster that occur at respective frequencies due to various downtime period sources, and include an application failover time period for switching the running of said application program from any one of said computers to another;

generating from said input parameters, a single computer virtual downtime period and a single computer virtual time between stops and a single computer virtual stoppage rate;

estimating a first annual stoppage time for said application program, due solely to concurrent stoppage of all of said computers, as a function of the ratio of said single computer virtual downtime period over said single computer virtual time between stops;

estimating a second annual stoppage time for said application program, due solely to switching the running of said application program from one computer to another as a function of said single virtual stoppage rate and said application failover time period; and, determining said availability of said application program on said cluster from the sum of said first and second annual stoppage times.

2. A method according to claim 1 wherein said first annual stoppage time for said application is estimated as two times the square of said ratio times the number of hours per year.

3. A method according to claim 1 wherein said first annual stoppage time for said application is estimated as six times the cube of said ratio times the number of hours per year.

4. A method according to claim 1 wherein said first annual stoppage time for said application is estimated as N factorial times said ratio raised to the Nth power times the number of hours per year.

5. A method according to claim 1 wherein said second annual stoppage time for said application is estimated as said single virtual stoppage rate times said application failover time period.

6. A method according to claim 1 wherein said single virtual downtime period is generated as the sum of multiple products divided by said single virtual stoppage rate, and where each product is formed by multiplying one of said multiple downtimes periods for each computer with its respective frequency of occurrence.

7. A method according to claim 1 wherein said single virtual stoppage rate is generated as the sum of said respective frequencies of occurrence for each of said multiple downtime periods.

8. A method according to claim 1 wherein said multiple downtime periods that occur at respective frequencies in each computer of said cluster include an average hardware stoppage time period that occurs at a first frequency, an average software stoppage time period that occurs at a second frequency, and an average system administrator stoppage time period that occurs at a third frequency.

9. A method according to claim 1 wherein said input parameters include a relatively short downtime period which occurs at a relatively high frequency that is due to defects in said application programs, and include a relatively long downtime period which occurs at a relatively low frequency that is due to hardware failures in said cluster.

10. A method according to claim 9 wherein said relatively high frequency of occurrence has a range of one per 1–1000 hours, and said relatively low frequency of occurrence has a range of one per 1,000–20,000 hours.

11. A method according to claim 9 wherein said relatively short downtime period has a range of 1–60 minutes, and said relatively long downtime period has range of 1–60 hours.

12. A method according to claim 1 wherein said failover time period has a range of 0.001–60 minutes.

13. A program storage device embodying an estimator program that performs method steps for estimating the availability of an application program that runs on any computer in a cluster of at least two computers; said method including the steps of:

receiving input parameters which include multiple average downtime periods for each computer in said cluster that occur at respective frequencies due to various downtime period sources;

generating from said input parameters, a single computer virtual downtime period and a single computer virtual time between stops; and, estimating a probability of concurrent stoppage for all of said computers, as a function of the ratio of said single computer virtual downtime period over said single computer virtual time between stops.

14. A method according to claim 13 wherein said probability of concurrent stoppage is estimated as two times the square of said ratio.

15. A method according to claim 14 wherein said single virtual downtime period is generated as the sum of multiple products divided by the sum of said respective frequencies; where each product is formed by multiplying one of said multiple downtimes periods for each computer with its respective frequency.

16. A method according to claim 13 wherein said probability of concurrent stoppage is estimated as six times the cube of said ratio.

17. A method according to claim 16 wherein said single virtual downtime period is generated as the sum of multiple products divided by the sum of said respective frequencies; where each product is formed by multiplying one of said multiple downtimes periods for each computer with its respective frequency.

18. A method according to claim 13 wherein said probability of concurrent stoppage is estimated as N factorial times said ratio to the Nth power, where N is an integer greater than three.

19. A method according to claim 18 wherein said single virtual downtime period is generated as the sum of multiple products divided by the sum of said respective frequencies; where each product is formed by multiplying one of said multiple downtimes periods for each computer with its respective frequency.

* * * * *